(12) United States Patent
Svens

(10) Patent No.: US 9,666,911 B2
(45) Date of Patent: May 30, 2017

(54) INTRINSIC OVERCHARGE PROTECTION FOR BATTERY CELL

(71) Applicant: SCANIA CV AB, Södertälje (SE)

(72) Inventor: Pontus Svens, Rönninge (SE)

(73) Assignee: SCANIA CV AB (SE)

( * ) Notice: Subject to any disclaimer, the term of this patent is extended or adjusted under 35 U.S.C. 154(b) by 43 days.

(21) Appl. No.: 14/893,708

(22) PCT Filed: May 16, 2014

(86) PCT No.: PCT/SE2014/050602
§ 371 (c)(1),
(2) Date: Nov. 24, 2015

(87) PCT Pub. No.: WO2014/193291
PCT Pub. Date: Dec. 4, 2014

(65) Prior Publication Data
US 2016/0111756 A1    Apr. 21, 2016

(30) Foreign Application Priority Data
May 31, 2013    (SE) ........................... 1350667

(51) Int. Cl.
*H01M 10/42*    (2006.01)
*H01M 2/34*    (2006.01)
*H01M 10/0525*    (2010.01)
*H01M 2/16*    (2006.01)
*H01M 10/052*    (2010.01)
(Continued)

(52) U.S. Cl.
CPC ..... *H01M 10/4235* (2013.01); *H01M 2/1653* (2013.01); *H01M 2/1686* (2013.01); *H01M 2/34* (2013.01); *H01M 10/052* (2013.01); *H01M 10/0525* (2013.01); *H01M 10/0565* (2013.01); *H01M 10/0585* (2013.01);
(Continued)

(58) Field of Classification Search
CPC . H01M 2/34; H01M 10/4235; H01M 10/4257
See application file for complete search history.

(56) References Cited

U.S. PATENT DOCUMENTS 4,879,188 A    11/1989    Meinhold et al.
2003/0129499 A1    7/2003    Choy et al.
(Continued)

FOREIGN PATENT DOCUMENTS

WO    WO 2006/048732 A1    5/2006
WO    WO 2008/151163 A2    12/2008

OTHER PUBLICATIONS

International Search Report dated Sep. 3, 2014 issued in corresponding International patent application No. PCT/SE2014/050602.

*Primary Examiner* — Stewart Fraser
(74) *Attorney, Agent, or Firm* — Ostrolenk Faber LLP

(57) ABSTRACT

The specification discloses a battery cell having an intrinsic overcharge protection, a battery made with the battery cell, and a method for manufacturing the battery cell. The battery cell includes, in the following order, a positive electrode, at least one polymer film that is electrically conducting and has an ion conducting electrolyte distributed therein, a P-doped and electrically semi-conducting and ion conducting film, an N-doped and electrically semi-conducting and ion conducting film, and a negative electrode.

24 Claims, 2 Drawing Sheets

Figure 1:
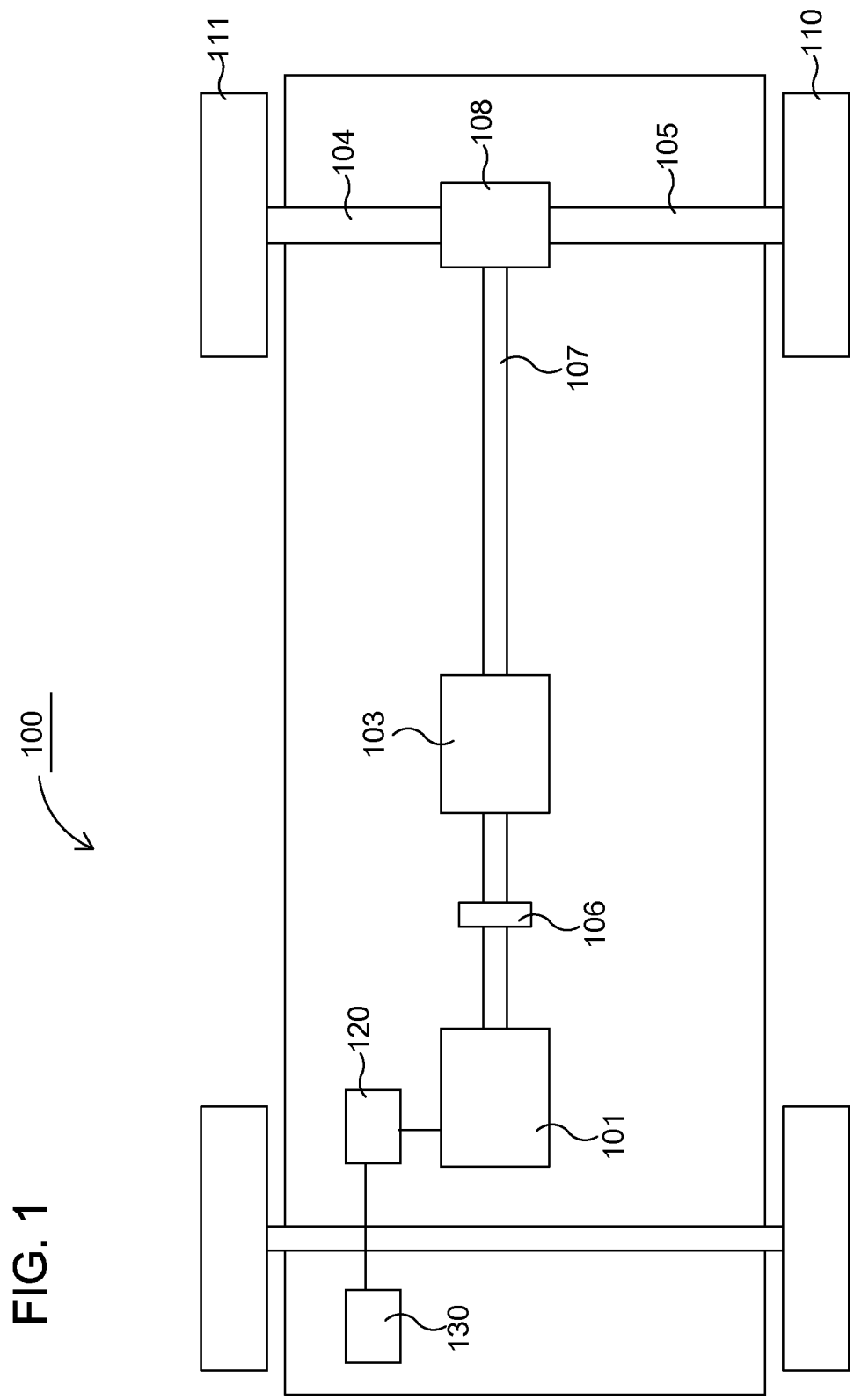

(51) Int. Cl.
*H01M 10/0585* (2010.01)
*H01M 10/0565* (2010.01)

(52) U.S. Cl.
CPC .... *H01M 10/4257* (2013.01); *H01M 2200/00* (2013.01); *H01M 2220/20* (2013.01); *Y02T 10/7011* (2013.01)

(56) References Cited

U.S. PATENT DOCUMENTS

| | | |
|---|---|---|
| 2005/0208347 A1 | 9/2005 | Nagayama et al. |
| 2008/0248335 A1* | 10/2008 | Kinoshita ......... H01M 10/0418 429/7 |
| 2009/0176162 A1* | 7/2009 | Exnar .................... H01B 1/122 429/336 |
| 2016/0072071 A1* | 3/2016 | Yumura .............. H01L 51/0047 320/101 |
| 2016/0276711 A1* | 9/2016 | Izumo ................ H01M 10/052 |

* cited by examiner

INTRINSIC OVERCHARGE PROTECTION FOR BATTERY CELL

CROSS-REFERENCE TO RELATED APPLICATIONS

The present application is a 35 U.S.C. §371 national phase conversion of PCT/SE2014/050602, filed May 16, 2014, which claims priority to Swedish Application No. 1350667-0, filed May 31, 2013, the contents of which are incorporated herein by reference.

TECHNICAL FIELD

The present invention pertains to a battery cell, and a battery. The present invention also pertains to a method for the manufacture of a battery cell.

BACKGROUND

The following background description constitutes a description of the background to the present invention, and thus need not necessarily constitute prior art.

Batteries are used today in a great number of devices, such as in vehicles, vessels, and in various electronic equipment, such as for example in computers, mobile telephones and toys. Generally, there are batteries in most electrical devices, which at least partly are designed so that they may be used without being connected to a power network. In this application, batteries are described primarily in their application for vehicles. However, they may of course also be used in other applications for vessels and various other electronic equipment which comprises batteries.

A battery comprises one or several battery cells, which may have a number of different designs and comprise a number of different substances and/or chemical compounds.

As a person skilled in the art well knows, a battery/accumulator is drained when it is used and/or loses charging over time when it is not used. When the battery is drained, substantially reversible transformations of chemical compounds occur within the battery. For example, the electrode materials comprised in the batteries may then be transformed from one chemical compound into another.

The battery/accumulator may be charged again through an external voltage source, for example, a generator in a vehicle or a vessel, or through a battery charger of some type, connected to the battery's poles. By applying the external voltage to the battery's poles, the poles' chemical composition is restored and the battery is charged again.

BRIEF DESCRIPTION OF THE INVENTION

Batteries comprising organic electrolytes, such as electrolytes comprising zinc ions, sodium ions and/or lithium ions, are sensitive to high temperatures and high cell voltages, which accelerate the ageing of the batteries. Additionally the electrolyte is very flammable. For example, temperatures exceeding around 55° C. and/or cell voltages exceeding around 4.2 V may accelerate the aging of a lithium ion battery. At higher cell voltages there is also a risk of gas development, degradation of the battery cells and/or fire in the battery cells.

Prior art technology has attempted to solve these problems by introducing solid phase electrolytes into batteries, such as a lithium salt dissolved in polyethylene oxide, and/or through the use of one or several external support functions, such as voltage monitoring of the cell voltage at charging.

Even though the solid phase electrolytes generally are not particularly flammable, there is still a risk of overheating of the battery cells, since they lack intrinsic overcharge protection. Hence, robust support functions are required at charging when this prior art solution is used.

The use of support functions, such as electronic monitoring at charging of the batteries, which was thus required previously to avoid the accelerated aging and/or the destruction of the batteries, contribute to an increasing complexity and an increasing manufacturing cost for the device, for example, a vehicle, in which the batteries are used.

Prior art technology has tried to solve the problem with the increasing complexity for overcharge protection by using electrochemically active materials between the positive and negative electrodes of the battery. These electrochemically active materials, however, absorb and/or emit ions when the overcharge protection is activated, which changes the material, resulting in the deterioration of the function over time. The prior art overcharge protections, which use these electrochemical materials, become slower after having acted as overcharge protection for some time. Thus, over time the risk of damaging the battery due to overcharging increases.

Prior art technology has also tried to solve the problem with overcharging by implementing discrete particles and/or discrete components in the battery cell to provide overcharge protection. However, the use of these discrete particles and/or components means that the power flow is concentrated at these discrete particles and/or components. Such concentrations of the power flow, for example, for positions at the respective particle or at the connection of a discrete overcharge component to the battery cell, generate heat.

It is therefore one objective of the present invention to provide a battery cell, a battery and a method for manufacture of a battery cell which at least partly solve these problems.

This objective is achieved through the above mentioned battery cell a battery, and a method for the manufacture of a battery cell according to the present invention.

The battery cell according to the present invention comprises a positive and a negative electrode separated by at least one electrically conducting polymer film, which has an ion conducting electrolyte distributed within itself, a P-doped and electrically semi-conductive and ion conductive film, and an N-doped and electrically semi-conductive and ion conductive film.

More specifically, the battery cell has the following layers in the following order, which create the intrinsic overcharge protection:

the positive electrode; followed by
the at least one polymer film; followed by
the N-doped and electrically semi-conducting and ion conducting film; followed by
the P-doped and electrically semi-conducting and ion-conducting film; followed by
the negative electrode.

According to the present invention, through the battery cell's design, an intrinsic/chemical overcharge protection is provided for the battery cell, which prevents too large an application of charging voltages to the battery cell.

The intrinsic/chemical overcharge protection provides an internal and automatic battery cell protection without the need for external voltage monitoring devices. This means that a degrading of the battery cell's capacity is counteracted without any added complexity and/or manufacturing cost for the device, for example a vehicle, in which the battery is used. In addition, the battery cell's function is not degraded by the activation of the overcharge protection, since the overcharge protection is electrically active, and not electrochemically active.

By integrating an overcharge protection in the one or several battery cells at the manufacturing stage of the battery, a reduction in the complexity for the monitoring electronics in the battery charger and/or other battery monitoring systems, for example, in at least partly electrified vehicles, such as electric vehicles or hybrid vehicles, may be achieved. The total cost for the battery system is thus reduced.

Advantageously, P-doped and the N-doped films may be permitted to have a worse ion conducting ability than the ion conducting ability of the at least one polymer film in the three-layer arrangement that includes the at least one polymer film, the P-doped film, and the N-doped film arranged in layers next to each other. As long as the at least one polymer film is thick enough to protect the battery cell from internal short-circuits during the life of the battery cell, the P-doped and the N-doped films may be made so thin that they do not significantly impact the battery cell's internal resistance.

Thanks to the present invention a lithium ion battery, for example, becomes a simpler and an equally reliable alternative as the previously commonly used chargeable nickel-hybrid batteries.

The battery cell according to the present invention may advantageously be used in high temperature applications, for example, at temperatures around 90° C.-100° C., but also has a good performance at lower temperatures, for example, room temperature.

In a battery where several battery cells are connected in series to a module, which also gives a higher voltage, the overcharge protection may according to the present invention also provide an intrinsic active balancing function between the battery cells in the battery when charging. This facilitates a simplification of the balancing electronics, for example, for hybrid vehicles and electric vehicles.

The overcharge protection has according to one embodiment of the invention a characteristic similar to a Zener-diode. This means that the intrinsic overcharge protection may very quickly be activated to protect the battery cell in fast voltage sequences and during voltage transients.

According to one embodiment of the present invention, the intrinsic overcharging protection is homogeneously integrated in the battery cell. That is, the at least one polymer film has a homogeneous distribution of electrically conducting material and that the P-doped and N-doped films have a homogeneous distribution of electrically semi-conducting material. Thus, a battery cell is created with an even power distribution in the event of a short-circuit, where the voltage U over the battery cell is greater than the absolute amount for the created Zener-diode's breakdown voltage $|U_Z|$; $U > |U_Z|$. Since the short-circuit power is distributed over the entire volume, large short-circuit currents may be handled by the battery cell without formation of any damaging heat.

Through the present invention, a very compact battery cell is provided, which comprises a reliable overcharge protection, and which is easy to manufacture, including in large numbers.

BRIEF LIST OF FIGURES

Figure 2:
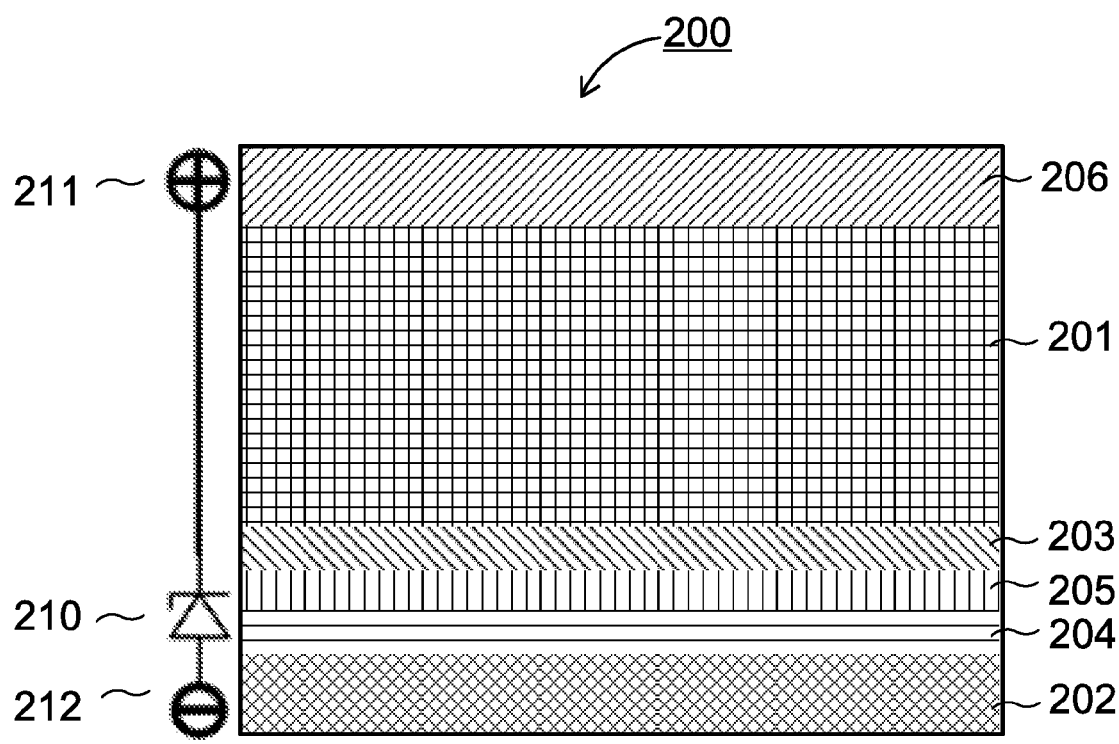
Figure 3:
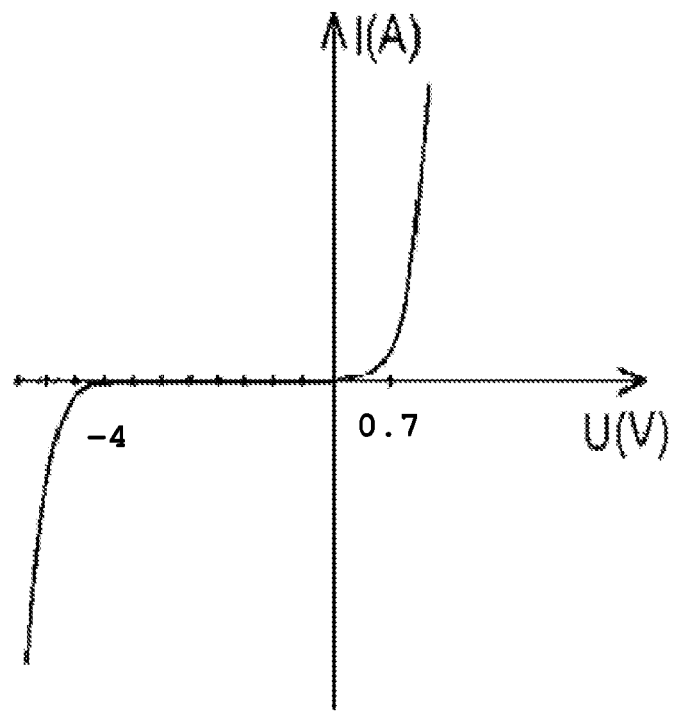

The invention will be illustrated in more detail below, along with the enclosed drawings where similar references are used for similar parts, and where:

FIG. 1 shows an example vehicle in which the present invention may be implemented, FIG. 2 shows a battery cell according to the present invention, FIG. 3 shows a diode characteristic, which is used by a battery cell according to one embodiment of the present invention.

DESCRIPTION OF PREFERRED EMBODIMENTS

FIG. 1 shows schematically an example vehicle 100, which may comprise the present invention. The vehicle 100, which may be a passenger car, a truck, a bus or another vehicle, comprises a drive line, which conveys power to driving wheels 110, 111 in the vehicle 100. The drive line comprises one engine 101, which in a customary manner, via an output shaft 102 on the engine 101, is connected to a gearbox 103 via a clutch 106. The engine 101 may, for example, be an electric engine, a hybrid engine or a combustion engine. The vehicle's drive line may comprise a conventional manual gearbox, an automatic transmission, a hybrid drive line, etc.

The vehicle comprises at least one battery 120. If the engine 101 is an electric engine, the battery 120 is used to at least partly drive the engine 101. If the engine 101 is a pure combustion engine which is driven by fuel, the battery 120 is used among others to drive a start engine in the engine 101, and to provide power to the engine's ignition system.

The battery 120 also provides power to operate electric equipment 130 in the vehicle. This electric equipment 130, which is illustrated schematically in FIG. 1, may comprise among others headlights and other lights, miscellaneous instruments, wipers, seat heaters, stereo equipment, video equipment, cigarette lighters and sockets for external equipment connected to the vehicle.

An output shaft 107 from the gearbox 103 drives the wheels 110, 111 via a final drive 108, such as a customary differential, and drive shafts 104, 105 connected to said final drive 108.

According to one aspect of the present invention, a battery cell 200 is provided, which is displayed schematically in FIG. 2.

The battery cell 200 comprises a positive electrode 201 and a negative electrode 202, separated by at least one polymer film 203. According to the present invention, an intrinsic/chemical overcharge protection for the battery cell is provided, which prevents the above-described accelerated aging due to overcharging of the battery cell.

The intrinsic overcharge protection is created according to the invention by arranging, between the negative electrode 202 and the at least one polymer film 203, a P-doped and electrically semi-conducting and ion conducting film 204, and an N-doped and electrically semi-conducting and ion conducting film 205. Additionally, the at least one polymer film 203 is electrically conducting and has an ion conducting electrolyte distributed within itself.

Thus, the battery cell 200 has, according to the present invention, the following layers in the following order, the layers creating the intrinsic overcharge protection:
the positive electrode 201; followed by
the at least one polymer film 203; followed by
the N-doped and electrically semi-conducting and ion conducting film 205; followed by
the P-doped and electrically semi-conducting and ion conducting film 204; followed by
the negative electrode 202.

Additionally, the battery cell comprises a current feeder 206, which may consist of a number of materials, for example, aluminium.

A battery 120 may comprise one or several battery cells 200, according to the present invention. The number of cells in the battery 120 depends on the voltage and/or power which the battery 120 is to provide.

Through the placement of the above mentioned layers in the above mentioned order in the battery cell, an intrinsic/chemical overcharge protection is achieved in the battery cell, which is described in more detail below. This intrinsic/chemical overcharge protection in the battery cell means that the battery cell, and thus the battery including the battery cell, would have an internal overcharge protection, which automatically, and without any involvement of complexity-creating voltage monitoring devices, prevent the occurrence of dangerously high cell voltages. Thus, accelerated aging and/or destruction of the battery cell and the battery is counteracted without any added complexity and/or manufacturing cost for the device, for example, a vehicle, in which the battery is used.

The positive electrode 201 of a battery cell typically consists of a porous structure of metal oxide or metal phosphate, surrounded by an ion conducting electrolyte either in liquid form, in gel-form or in solid form. That is, the positive electrode 201 consists of an electrolyte in an ion conducting solid phase or in an ion conducting liquid phase.

The at least one thin polymer film 203 may consist of a so-called separator, which separates the positive electrode 201 from the negative 202, and which for example may consist of a thin foil of lithium metal or a porous graphite structure.

The NP-transition between the P-doped 204 and N-doped 205 films functions according to one embodiment as a diode. Thus no electric power I may flow in the diode's reverse direction, from N 205 to P 204, within the battery's normal operating area. Hence, no electric power I may flow from the positive electrode 201 and to the negative electrode 202 within the battery's normal operating area.

The overcharge protection in the battery cell 200 according to the present invention thus provides, according to one embodiment, a diode characteristic over the P-doped 204 and N-doped 205 films, which are arranged between the negative electrode 202 and the at least one polymer film 203. This is illustrated to the left in FIG. 2 by way of a schematic electric diagram, representing the overcharge protection in the battery cell 200 as a diode 210 arranged between the positive electrode/current feeder 211 and the negative electrode/current feeder 212.

The diode 210 may have a diode characteristic comprising a Zener-function, which may be created through optimization of the P-doped 204 and N-doped 205 films. The breakdown voltage $U_Z$ in the Zener-function is determined through selection of one or several features for the P-doped 204 and the N-doped 205 film.

FIG. 3 shows an example of a power characteristic I for a Zener-diode as a function of the voltage U over the diode. As shown in the example characteristic in FIG. 3, substantially no electric power I flows through the diode 210 for voltages between 0 volt and the Zener-diode's breakdown voltage $U_Z$, which in FIG. 3 is around −4.2 V (Volt). Since the Zener-diode 210 is reverse-biased across the battery cell 200, this means that substantially no electric power will flow through the overcharge protection within the battery cell's normal operating area, which may for example be the interval around 2 V to around 4 V, representing around −2 V to around −4 V in FIG. 3, since the diode 210 is reverse-biased. Thus, substantially no power I will flow through the PN-transition between the P-doped 204 and the N-doped 205 films within the voltage interval where the battery cell 200 normally operates.

Instead, at normal usage electric power I is led internally within the battery cell 200 through ions when the voltage U over the battery cell 200 is less than the absolute amount for the breakdown voltage $|U_Z|$ for the Zener-function/characteristic, $U<|U_Z|$.

If, on the other hand, the battery cell voltage U passes the absolute amount for the breakdown voltage $|U_Z|$ for the Zener-function/characteristic ($U<|U_Z|$) the PN-transition between the P-doped 204 and the N-doped 205 films becomes electrically conductive. Hence, an electric current I is permitted (that is to say a current through movement of electrons, to move internally within the battery cell 200) from the positive electrode 201 to the negative electrode 202, when the voltage U over the battery cell 200 is greater than the absolute amount for the Zener-diode's breakdown voltage $|U_Z|$, $U>|U_Z|$. It is known to a person skilled in the art that a current I flowing from the positive electrode 201 to the negative electrode 202 is compensated by electrons moving from the negative electrode 202 to the positive electrode 201.

As is schematically illustrated in FIG. 3 the characteristics for the Zener-diode are very steep. This means that the intrinsic overcharge protection according to the present invention is very quickly activated to protect the battery cell. Thus, the present invention may provide good protection against quickly changing voltages, such as voltage peaks, voltage steps or other fast processes.

In other words, an electric current I may flow through the battery cell 200 via the semi-conducting films 204, 205 when the battery voltage U exceeds the absolute amount for the Zener-diode's breakdown voltage $|U_Z|$, for example, when the battery voltage U exceeds around 4.2 V for the diode characteristics displayed in FIG. 3. The battery voltage U which charges the battery cell is thus limited without any external impact to a maximum battery voltage $U_{max}$, corresponding to the absolute amount for the Zener-diode's breakdown voltage $|U_Z|$, $U_{max}=|U_Z|$. An automatic limitation of the battery voltage U to a value smaller than or equal to the absolute amount for the Zener-diode's breakdown voltage $|U_Z|$ ($U \leq |U_Z|$) is thus achieved through the present invention, regardless of the size of the charge current and/or charging voltage over the battery cell 200.

The liquid internal electronic current I through electron movement means that the battery cell is short-circuited electrically whilst charging is maintained. This also means that at least one chemical and/or electrochemical reaction in the battery cell decreases. The chemical reactions, which are problematic to the battery cell, require increasing battery voltage U over the battery cell in order to keep the reactions active. When this battery voltage U no longer increases, these chemical reactions thus stop. Thus premature aging for the battery cell 200 due to overcharging is effectively and reliably counteracted.

Since the PN-transition, i.e. the transition between the P-doped 204 and N-doped 205 films, has a large surface, the current through the intrinsic overcharge protection at the Zener-breakthrough are distributed over a large surface, which results in an even and low heat development in the battery cell at overcharging.

According to one embodiment of the present invention, the intrinsic overcharge protection is homogeneously integrated in a volume for the at least one polymer film 203. This integration may be homogeneous, or at least substantially homogeneous, in this volume, all the way down to the molecular level. Hence, a battery cell is created which has an even power distribution, that is to say a substantially evenly distributed power flow, in the event of a short-circuit when the voltage U over the battery cell 200 is larger than the absolute amount for the Zener-diode's breakdown voltage $|U_z|$, $U>|U_z|$. Since the short-circuit power is distributed over the entire volume, large short-circuit currents may be handled by the battery cell according to the invention, without any damaging heat formation arising.

This is a great advantage compared to prior art solutions, in which the power flow has been concentrated around certain discrete particles and/or components, which have acted as overcharge protection in the battery cell, resulting in relatively powerful and at least partly destructive heating at the location of these concentrations of power.

According to one embodiment of the present invention, the ion conducting electrolyte which is distributed in the at least one electrically conducting polymer film 203 in the intrinsic overcharge protection, consists of an organic electrolyte. The organic electrolyte may be in a solid phase, in a liquid phase, or in a gel-form, and may comprise one or several of:

an ion conducting solution comprising zinc ions;
an ion conducting solution comprising sodium ions;
an ion conducting solution comprising lithium ions;
an ion conducting polymer film comprising zinc ions;
an ion conducting polymer film comprising sodium ions; and
an ion conducting polymer film comprising lithium ions.

According to one embodiment, the battery cell 200 is a lithium ion battery cell. Here, the at least one polymer film 203 consists of a separator, which is electrically conducting and conducting for lithium ions. The P-doped 204 and N-doped 205 films are electrically semi-conducting polymer films, which are conducting for lithium ions. Lithium ion batteries have a range of advantages, among others, according to one embodiment, they function well in high temperature applications (at temperatures around 90° C.-100° C.) such as for applications in hybrid vehicles. Lithium ion batteries also have a high energy density and are relatively harmless to the environment.

According to one embodiment of the present invention, each one of the P-doped 204 and N-doped 205 films comprise one or several of, and/or combinations of, the materials:

NTCDA (naphthalene 1,4,5,8-tetra-carboxylic acid dianhydride; n-type);
Ppy (polypyrrole; p-type);
PEDT:PSS poly(3,4-ethylene-dioxythiophene):poly(styrenesulphonate); p-type);
PTCDA (perylene 3,4,9,10-tetracarboxylic acid dianhydride; n-type);
PTCDI (perylene 3,4,9,10-tetracarboxylic acid diimides; n-type)

As a person skilled in the art will know, several battery cells may be connected in series, in order to provide one battery with a suitable total voltage. In a battery where at least two battery cells are connected in series, the overcharge protection may according to the present invention also provide an intrinsic active balancing function between the battery cells in the battery, when charging the battery. This facilitates a simplification of the balancing electronics, for example, for hybrid vehicles and electric vehicles, or in other devices for charging of batteries.

According to one aspect of the present invention, a method is provided for the manufacture of the above described battery cell 200. The battery cell 200 comprises a positive electrode 201 and a negative electrode 202, which are separated by at least one polymer film 203, arranged between the positive 201 and negative 202 electrodes.

According to the method, the battery cell 200 is equipped with an intrinsic overcharge protection through distributing an ion conducting electrolyte in the at least one electrically conducting polymer film 203, through P-doping of an electrically semi-conducting and ion conducting film 204, through N-doping of an electrically semi-conducting and ion conducting film 205, and by arranging the P-doped 204 and N-doped 205 films between the negative electrode 201 and the at least one polymer film 203. In the process of manufacturing of the battery cell 200, the positive electrode 201 may be joined with the at least one polymer film 203. These layers are joined also with the N-doped electrically semi-conducting and ion conducting film 205. These layers are joined also with the P-doped electrically semi-conducting and ion conducting film 204. These layers are joined with the negative electrode 202.

In this way, the battery cell described in detail above may be manufactured, which produces a battery cell 200 with the above described advantages.

According to one embodiment of the present invention, the ion conducting electrolyte is distributed homogeneously in the at least one polymer film's 203 volume. In other words, the electrically conducting material is distributed within the at least one polymer film's 203 volume. Additionally, the electrically semi-conducting material in the P-doped 204 and N-doped 205 films is distributed homogeneously. This homogeneous distribution of the electrically conducting and electrically semi-conducting materials means that the intrinsic overcharge protection is integrated homogeneously all the way down to molecular level of the battery cell 200, so that large short-circuit currents may be handled substantially without any destructive heating of the overcharge protection, since the current flow is distributed over the entire volume.

One function with Zener-characteristics for the overcharge protection may be created through the PN-transition, that is to say, through the P-doped 204 and N-doped 205 films in combination. Thus, a suitable breakthrough voltage $V_Z$ may be selected for the Zener-function, so that charging occurs within the battery cell's normal operating area, but efficiently and reliably is prevented from occurring outside the battery cell's normal operating area.

The ion conducting electrolyte may be in a solid phase, in a liquid phase or in gel-form, and may consist of an organic electrolyte, such as an ion conducting solution comprising zinc ions, sodium ions, or lithium ions. The ion conducting electrolyte may also consist of an ion conducting polymer film comprising zinc ions, sodium ions, or lithium ions.

The above mentioned P-doped 204 and N-doped 205 films, respectively, may be manufactured by one or several of, or combinations of, the above listed materials, namely:

NTCDA (naphthalene-1,4,5,8-tetra-carboxylic acid dianhydride; n-type);
Ppy (polypyrrole; p-type);
PEDT:PSS poly(3,4-ethylene-dioxythiophene):poly(styrenesulphonate); p-type);
PTCDA (perylene 3,4,9,10-tetracarboxylic acid dianhydride; n-type);
PTCDI (perylene 3,4,9,10-tetracarboxylic acid diimides; n-type).

In the process of manufacturing of the battery cell 200 the positive electrode 201 may be joined with the at least one polymer film 203. These layers are joined also with the N-doped electrically semi-conducting and ion conducting film 205. These layers are joined also with the P-doped electrically semi-conducting and ion conducting film 204. These layers are joined with the negative electrode 202. All of these joined layers constitute, following potential cropping and other adjustment, a film of several layers, from which the battery cell and its intrinsic overcharge protection is obtained. For example, the film with several layers may be rolled up, or placed in layers above each other, and be cropped to a size suitable for a battery cell 200.

To use thin films according to the present invention, which may be at least partly homogeneous, to create the intrinsic overcharge protection is compatible with today's manufacturing process for battery cells. For this reason, today's manufacturing processes may easily be modified in order to produce battery cells/batteries according to the present invention. Thus, battery cells/batteries with reliable overcharge protection may be mass produced at very little increased cost.

Thus, a very compact battery cell is obtained, which comprises a reliable, fast and exact overcharge protection, and which is also easy to manufacture. The manufacturing method according to the present invention solves the manufacturing problems which have existed with prior art solutions, which use discrete components as overcharge protection. Such discrete components may be very difficult to connect to a battery cell, and the use of such discrete overcharge protection may not permit the above mentioned manufacturing in which films with several layers are rolled up to create compact battery cells.

The present invention is not limited to the embodiments of the invention described above, but pertains to and comprises all embodiments within the protected scope of the enclosed independent claims.

The invention claimed is:

1. A battery cell having an intrinsic overcharge protection capability comprising in the following order,
    a positive electrode;
    at least one polymer film, which is electrically conducting and comprises one ion conducting electrolyte distributed in said at least one polymer film;
    an N-doped electrically semi-conducting and ion conducting film;
    a P-doped electrically semi-conducting and ion conducting film; and
    a negative electrode.

2. A battery cell according to claim 1, wherein said intrinsic overcharge protection is homogeneously integrated through a homogeneous distribution of electrically conducting material in a volume for said at least one polymer film, and through a homogeneous distribution of electrically semi-conducting material in said P-doped and N-doped films.

3. A battery cell according to claim 2, wherein said homogeneous integration of said intrinsic overcharge protection over said at least one polymer film is homogeneous in said volume down to a molecular level.

4. A battery cell according to claim 1, wherein said P-doped and N-doped films are arranged to define a diode.

5. A battery cell according to claim 4, wherein said diode exhibits a Zener characteristic to permit an electric current I to flow internally within said battery cell with ions, when a voltage U over said battery cell is less than an absolute amount for a breakthrough voltage $|U_z|$ for said Zener-function, $U<|U_z|$.

6. A battery cell according to claim 4, wherein said diode exhibits a Zener characteristic to permit an electrical current I to flow internally within said battery cell from said positive electrode to said negative electrode through electrons, when a voltage U over said battery cell is greater than an absolute amount for a breakthrough voltage $|U_z|$ for said Zener-function, $U>|U_z|$.

7. A battery cell according to claim 6, wherein said internal electronic current I through electrons short circuits said battery cell electrically with its charging intact.

8. A battery cell according to claim 6, wherein said internal electronic current I through electrons diminishes at least one chemical and/or electrochemical reaction in said battery cell.

9. A battery cell according to claim 6, wherein a breakdown voltage $U_z$ for said Zener-function is determined by selection of one or several features for said P-doped and N-doped films.

10. A battery cell according to claim 1, wherein said battery cell is a lithium ion battery cell, and wherein
    said at least one polymer film constitutes a separator which is electrically conducting and conducting for lithium ions; and
    said P-doped and N-doped films are polymer films which are electrically semi-conducting and conducting for lithium ions.

11. A battery cell according to claim 1, wherein said ion conducting electrolyte comprises an organic electrolyte.

12. A battery cell according to claim 11, wherein said organic electrolyte comprises at least one of the following:
    an ion conducting solution comprising zinc ions;
    an ion conducting solution comprising sodium ions;
    an ion conducting solution comprising lithium ions;
    an ion conducting polymer film comprising zinc ions;
    an ion conducting polymer film comprising sodium ions; and
    an ion conducting polymer film comprising lithium ions.

13. A battery cell according to claim 11, wherein said organic electrolyte is at least one of the following:
    an ion conducting solid phase; and
    an ion conducting liquid phase.

14. A battery cell according to claim 1, wherein said P-doped film or, said N-doped film comprises at least one material from the following:
    NTCDA (naphthalene-1,4,5,8-tetra-carboxylic acid dianhydride; n-type);
    Ppy (polypyrrole; p-type);
    PEDT:PSS poly(3,4-ethylene-dioxythiophene):poly(styrenesulphonate); p-type);
    PTCDA (perylene 3,4,9,10-tetracarboxylic acid dianhydride; n-type); and
    PTCDI (perylene 3,4,9,10-tetracarboxylic acid diimides; n-type).

15. A battery comprising at least one battery cell according to claim 1.

16. A battery according to claim 15, wherein the battery comprises at least two battery cells connected in series according to claim 1, and wherein said intrinsic overcharge protection during charging provides an intrinsic active balancing function between said at least two battery cells.

17. A method for the manufacture of a battery cell having an intrinsic overcharge protection capability, comprising in the following order,
    forming a positive electrode;
    forming at least one polymer film on said positive electrode, which is electrically conducting and wherein an ion conducting electrolyte is distributed in said at least one polymer film;

forming an N-doped electrically semi-conducting and ion conducting film on said at least one polymer film;

forming a P-doped electrically semi-conducting and ion conducting film on said N-doped electrically semi-conducting and ion conducting film; and forming a negative electrode on said P-doped electrically semi-conducting and ion conducting film.

18. A method according to claim 17, wherein said ion conducting electrolyte is homogeneously distributed in a volume for said at least one polymer film, so that said intrinsic overcharge protection is integrated homogeneously down to a molecular level over said battery cell.

19. A method according to claim 17, wherein one or several features for said P-doped and N-doped films are selected to define a diode with a Zener characteristic having a suitable breakdown voltage $U_z$.

20. A method according to claim 17, wherein said ion conducting electrolyte is selected from the following:
- an ion conducting solution comprising zinc ions;
- an ion conducting solution comprising sodium ions;
- an ion conducting solution comprising lithium ions;
- an ion conducting polymer film comprising zinc ions;
- an ion conducting polymer film comprising sodium ions; and
- an ion conducting polymer film comprising lithium ions.

21. A method according to claim 20, wherein said organic electrolyte is one of the following:
- an ion conducting solid phase; and
- an ion conducting liquid phase.

22. A method according to claim 17, wherein said P-doped film or said N-doped film comprises a material selected from the following:
- NTCDA (naphthalene-1,4,5,8-tetra-carboxylic acid dianhydride; n-type);
- Ppy (polypyrrole; p-type);
- PEDT:PSS poly(3,4-ethylene-dioxythiophene):poly(styrenesulphonate); p-type);
- PTCDA (perylene 3,4,9,10-tetracarboxylic acid dianhydride; n-type); and
- PTCDI (perylene 3,4,9,10-tetracarboxylic acid diimides; n-type).

23. A method according to claim 17, wherein said forming steps result in a film with several layers, and further comprising rolling said film and cropping said rolled film to define a battery cell of a suitable size.

24. A method according to claim 17, wherein said forming steps result in a film with several layers, and further comprising arranging layers of said film on one another, and cropping said layers to define a battery cell of a suitable size.

* * * * *